United States Patent
Priebatsch

(10) Patent No.: US 8,838,501 B1
(45) Date of Patent: Sep. 16, 2014

(54) METHODS AND SYSTEMS FOR PERMISSIONS MANAGEMENT

(71) Applicant: Seth Priebatsch, Boston, MA (US)

(72) Inventor: Seth Priebatsch, Boston, MA (US)

(73) Assignee: SCVNGR, Inc., Boston, MA (US)

( * ) Notice: Subject to any disclaimer, the term of this patent is extended or adjusted under 35 U.S.C. 154(b) by 0 days.

(21) Appl. No.: 14/190,695

(22) Filed: Feb. 26, 2014

(51) Int. Cl.
  *G06Q 99/00* (2006.01)
  *G06Q 20/38* (2012.01)
  *G06Q 30/06* (2012.01)

(52) U.S. Cl.
  CPC ........ *G06Q 20/3821* (2013.01); *G06Q 30/0617* (2013.01); *G06Q 30/0635* (2013.01); *G06Q 30/0613* (2013.01); *G06Q 2220/00* (2013.01)
  USPC .................... 705/64; 705/26.41; 705/26.43

(58) Field of Classification Search
  USPC ...................... 705/26.41, 26.43, 64
  See application file for complete search history.

(56) References Cited

U.S. PATENT DOCUMENTS

| | | | |
|---|---|---|---|
| 5,892,900 A * | 4/1999 | Ginter et al. | 726/26 |
| 7,454,356 B2 * | 11/2008 | Fields et al. | 705/330 |
| 2004/0010463 A1 * | 1/2004 | Hahn-Carlson et al. | 705/39 |
| 2010/0088236 A1 * | 4/2010 | Karabulut et al. | 705/59 |
| 2012/0011019 A1 * | 1/2012 | Wakim | 705/26.3 |
| 2012/0095855 A1 * | 4/2012 | Sterling | 705/16 |
| 2012/0197749 A1 * | 8/2012 | Gray | 705/26.3 |
| 2014/0074719 A1 * | 3/2014 | Gressel et al. | 705/64 |

* cited by examiner

*Primary Examiner* — James D Nigh
(74) *Attorney, Agent, or Firm* — Bingham McCutchen LLP

(57) ABSTRACT

In various embodiments of the present invention, a facilitation token that includes authorization for a request manager to act on behalf of a resource is received from the request manager. A user-access token is also received from the request manager; the user-access token includes (i) a request, (ii) an identity of a user making the request, and (iii) permissions information. If the request is permitted by the resource, based on information in the facilitation token, the request is fulfilled.

21 Claims, 11 Drawing Sheets

METHODS AND SYSTEMS FOR PERMISSIONS MANAGEMENT

TECHNICAL FIELD

In various embodiments, the present invention relates generally to systems and methods for facilitating transactional processing of permission requests, e.g., requests to transfer money in order to complete purchase transactions.

BACKGROUND

Various types of electronic transactions involve one party making a request for access to a resource from another party, which request may be granted based on an explicit permission or transactional conformance to stored permission-granting criteria. One type of permission-related transaction also involves a payment associated with the request (e.g., a purchase for a good or service). Customers may purchase goods or services directly from a merchant or vendor via a variety of electronic means, including in-person or in-store means such as credit cards, debit cards, or mobile-phone payment applications and remote or network-based means such as a web site or mobile-phone application. By authorizing payment upon presentation of the transaction details, the customer gives explicit permission to a payment entity to pay the merchant in accordance with the presented terms.

Increasingly, the transactional relationship between buyer and seller is being attenuated by the emergence of third-party entities that serve as aggregators or portals for a plurality of merchants, vendors, or other entities. A customer typically interacts with the third-party entity via a web site or software application, and the third-party entity displays the goods or services offered by the aggregated merchants. The customer submits a request or order to the third-party entity, which relays the request to the appropriate merchant. If the merchant accepts, the third-party entity so informs the customer. The third-party entity may also act as a payment processor and interact with a funding source associated with the customer and submit payment to the merchant. In such transactional contexts, the additional involved parties increase the number of permissions required to actually complete the sale—for example, from customer to aggregator to vendor for payment, from a credit-card processor to the vendor for reimbursement, and from vendor to aggregator for order confirmation.

FIG. 1 illustrates an example environment 100 of such a transaction. A customer 102 visits a web page of an online food-services vendor 104, which displays the menu items of a plurality of restaurants 108. The customer 102 selects a food item for pick-up or delivery, and the vendor 104 communicates with a restaurant 108 associated with the food item to thereby fulfill the request of the customer 102. Payment for the item is received from a credit-card server 106 and supplied to the restaurant 108. FIG. 2 illustrates a more general example 200 of this sort of transaction, in which a requester 202 seeking access to a resource 204 communicates with a request relayer 206 in order to have a request granted by a request manager 208. Following permission from the request manager 208, the request relayer 206 communicates with the resource 204 in order to accord access to the requester 202 in accordance with the accepted terms of the request.

Aggregation may be attractive for customers because they need interact with only one entity, the request relayer 206, in order to access goods or services from a number of different request managers 208 (e.g., restaurants 108 in the above example). Request managers 208 may benefit from this type of transaction because, for example, they need not maintain electronic infrastructure, such as web pages and financial-transaction software, which instead is created and maintained by the request relayer 206. Outside the sales context, request managers may find it convenient to set up computationally resolvable criteria for permissions management and allow a third party to manage the mechanics of access. For example, the resource may be a collection of stock photographs that are licensed on standard terms depending on the requester's intended use, or even sensitive financial information that, for example, a merchant must make repeatedly accessible to actual or prospective sources of financing. In all of these cases, a firm's ability to expand its market audience (via an aggregator) or outsource permissions management (via a request handler) can be highly beneficial.

Other aspects of the transaction environment 200 are less advantageous. Because a request manager 208 does not interact directly with a requester 202, the request manager 208 cannot collect data about the requester 202, such as demographic data, location data, or purchase-history data. The request manager 208 is further limited in its inability to extend promotions, coupons, or offers to the requester 202. And while the network and/or financial infrastructure burden for request processing is at least partially lifted from the request manager 208, it is merely shifted to the request relayer 206, which must bear the burden of mediating access to the resource 204, e.g., creating and maintaining payment-processing functions in a purchase context. A need therefore exists for an improved system and method for facilitating permissions management in the context of electronic payments and other transactions.

SUMMARY

In general, various aspects of the systems and methods described herein involve electronic authorization for access to or purchase of goods and services (services including the delivery of electronic data or information). A requester submits a request for ultimate fulfillment from a resource to a request manager; the request manager forwards the request, and associated permissions granted by the requester and resource, to a permission-management system that is authorized to act on behalf of the resource and receives, reviews, and conditionally grants the request based on the granted permissions. The request manager may receive authorization tokens from either or both of the requester and resource; the tokens may include information regarding the identity, location, and/or payment information of the requester and conditions for granting requests from the resource. The permission-management system receives the tokens from the request manager, performs any necessary processing (e.g., handling payments), and collects information regarding the transaction behind the request. In various embodiments, the permission-management system presents offers, coupons, or other rebates to the requester for the current or future transactions based on the collected information and available offers.

In one aspect, a method for facilitating electronic transactions includes electronically receiving, from a request-manager device, a facilitation token comprising permissions to act with respect to a resource, electronically receiving, from the request-manager device, a request for goods or services from the resource and a user-access token comprising permissions to act on behalf of a user, verifying the facilitation token and the user-access token and that granting the request is permitted by the resource and the user based at least in part on information in the facilitation token and user-access token, and causing data transfer to a resource device associated with the resource to cause fulfillment of the request by the resource.

An identity of the user making the request or a location of the user making the request may be further received from the request-manager device. The method may further include storing, in a user-profile database, the identity of the user, a date or time that the request was made, or a type of the goods or services requested by the user. The request may include transfer of funds by a payment manager, the payment manager performing the verifying step and thereafter causing electronic transmission of the funds to the resource. The request may include transfer of restricted information by a resource manager, the resource manager performing the verifying step and thereafter causing electronic transmission of the restricted information to the user. The method may further include creating the facilitation token based on information received from the resource and transmitting the facilitation token to the request-manager device and/or creating the user-access token based on information received from the user and transmitting the user-access token to the request-manager device. A promotional offer may be transmitted to the user, wherein the promotional offer is based at least partly on information in the request. The promotional offer may be further based on at least one of a purchase history of the user or offer information received from the resource. The request manager may be an online food-services merchant and the resource is a restaurant. The request manager and resource may be the same or different entities.

In another aspect, a system for facilitating electronic transactions includes a database for storing customer, product, or services information associated with a resource, and a computer processor. The computer processor is configured for executing computer instructions for computationally executing the steps of electronically receiving, from a request-manager device, a facilitation token comprising permissions to act on behalf of the resource; electronically receiving, from the request-manager device, a request for goods or services from the resource and user-access token comprising permissions to act on behalf of a user; verifying the facilitation token and the user-access token and that granting the request is permitted by the resource and the user based at least in part on information in the facilitation token and user-access token; and causing data transfer to a resource device associated with the resource to cause fulfillment of the request by the resource.

The request-manager device may include a server. The computer processor may be further configured for electronically transmitting a promotional offer to the user, wherein the promotional offer is based at least partly on information in the request and information in the database. A promotional offer previously communicated to the user in connection with a previous request by the user may be redeemed. An identity of the user or a location of the user may be received from the request-manager device. The promotional offer may be further based on at least one of a purchase history of the user stored in the database or offer information received from the resource. The computer processor may cause fulfillment of the request following receipt by the system of funds associated with the request. The computer processor may be further configured for storing, in a user-profile database, the identity of the user, a date or time that the request was made, or a type of the goods or services requested by the user. The computer processor may be further configured for transmitting information to the user in fulfillment of the request.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
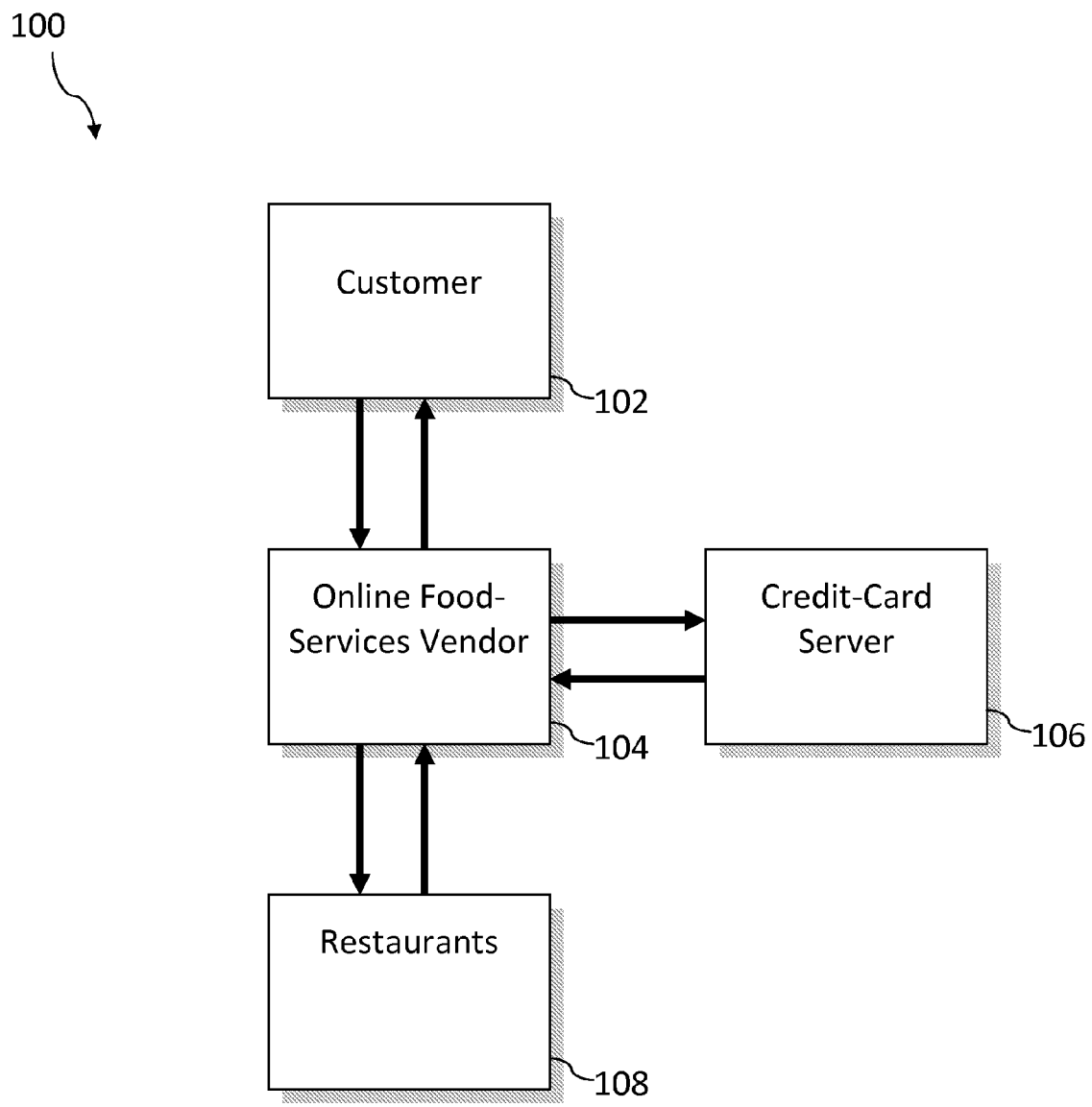
FIG. 1 illustrates an instance of an existing electronic-payment system.
Figure 2:
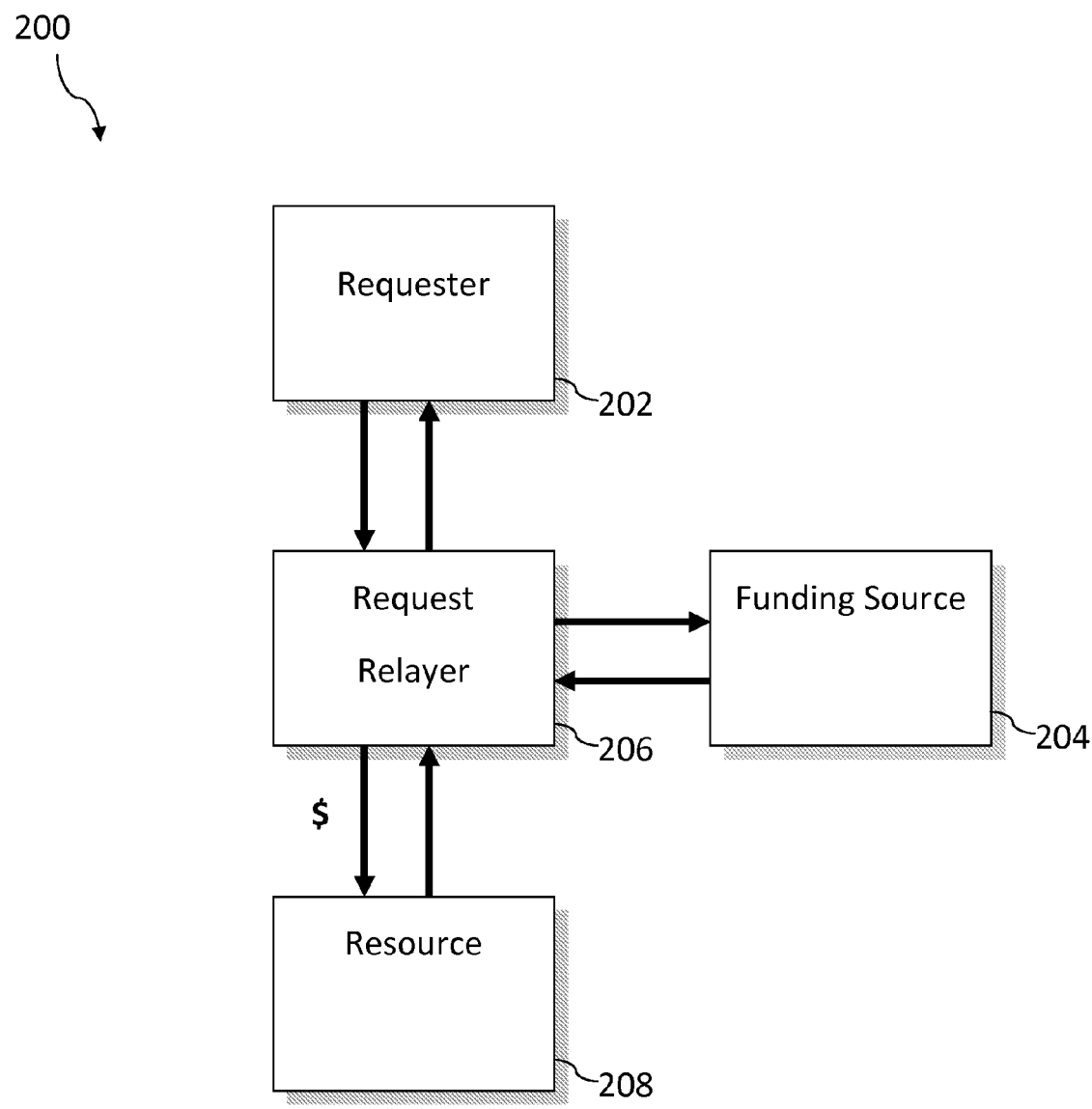
FIG. 2 illustrates a general example of an existing electronic-payment system.
Figure 3:
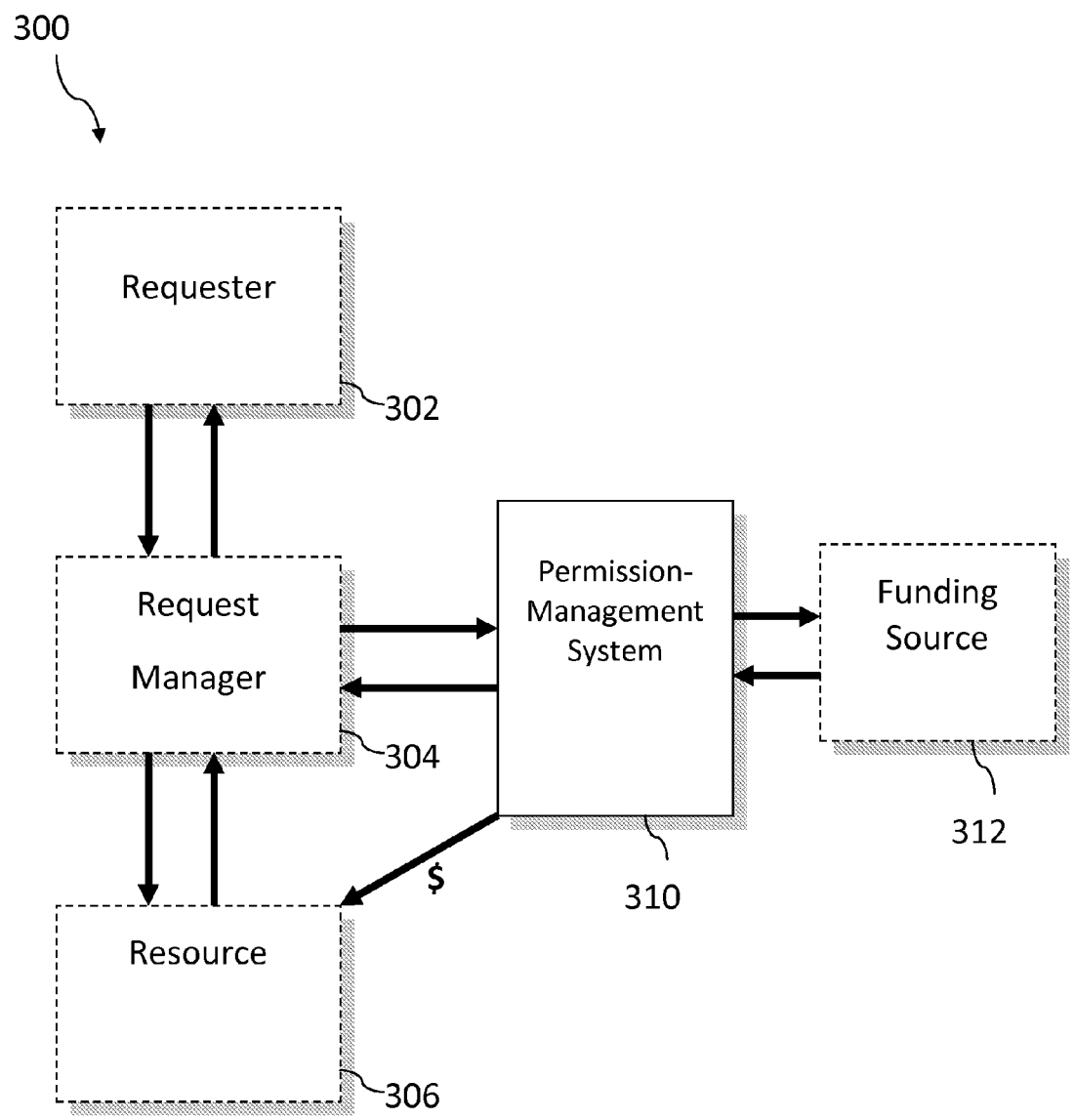
FIG. 3 illustrates an electronic-transaction system in accordance with embodiments of the present invention.

FIG. 3 illustrates a transaction environment 300 in accordance with embodiments of the present invention. Although the ensuing discussion focuses on payment processing in the context of a purchase transaction, it should be understood that the invention is broadly applicable to management of access to any resource. A requester 302 submits a request to a request manager 304 that has stored thereon indications of authority (referred to herein as "tokens" and described in greater detail below) from the requester 302 and a resource 306. The request manager 304 communicates with a permission-management system 310, in this case responsible for deciding whether or not to grant the request, payment processing, and/or data collection, and sends thereto the indications of authority to act on behalf of the requester 302 and on behalf of the resource 306. The system 310 analyzes the permissions defined in the tokens and conditionally grants the request based thereon; in some embodiments, the system 310 also processes a payment associated with the request, possibly drawing funds from a funding source 312, and sends the payment to the resource 306. The resource 306 then fulfills the request submitted by the requester 302.

The requester 302 may be any computing device, such as a desktop computer, laptop or portable computer, tablet computer, phone, smartphone, personal-digital assistant, or any other such device; the device may include a computer processor, such as an INTEL PENTIUM, computer memory, such as DRAM, non-volatile storage, such as flash RAM, solid-state storage, or magnetic storage, and/or user input/output means such as a keyboard, touchscreen, or display. The requester device may run any appropriate operating system or computing environment, such as MICROSOFT WINDOWS, APPLE OSX or IOS, ANDROID, LINUX, or any other operating system, and may further include software for accessing and communication with and amongst other devices in the environment 300, such as a web browser or communications application. The requester device may be operated by any person, customer, group of people or customers, business, or any other entity.

The request manager 304 and resource 306 may be or include servers or other computers running a web site, point-of-sale interface, communications application, or any other similar software applications for communications with the requester 302, resource 306, and/or system 310. The request manager 304 and resource 306 may include a processor, memory, storage, and/or input/output interface of the types listed above or of any other types. As explained in further detail below, the request manager 304 and/or resource 306 may include computer instructions or similar code or modules for receiving indications of authority from the requestor 302 and/or resource 306 for acting on behalf of those entities.

The system 310 may similarly be or include a server or other computer including a processor, memory, storage, and/or input/output interface of the types listed above or of any other types. As explained in greater detail below, the system 310 may include computer instructions for receiving indications of authority from the requester 302 and/or resource 306 (in some embodiments, via the request manager 304), conditionally granting the request based on the permissions, processing a payment associated with a request from the requester 302, collecting data on the request, requester 302, and/or resource 306 (or any other data), transmitting payment to the resource 306, transmitting collected data to the request manager 304 and/or the resource 306, or transmitting offers, promotions, coupons, or rebates to the requester 302.

The entities in the environment 300 may communicate via a variety of means. The requester 302 may communicate with the request manager 304 via a computer network such as the Internet. In other embodiments, the requester 302 may communicate with the request manager 304 via a point-of-sale interface, such as by displaying a number or barcode on the screen of the requestor 302 and presenting the screen to a scanning device in communication with the request manager 304. In one embodiment, the request manager 304, resource 306, and system 310 communicate via a network such as the Internet. In other embodiments, some or all of those entities 304, 306, 310 may be combined into one or more single components or systems and thus communicate directly within said components or systems. Some or all of the entities 304, 306, 310 may also be located within a subdomain or subnetwork and communicate via a local network or intranet instead of or in addition to the Internet.

Figure 4:
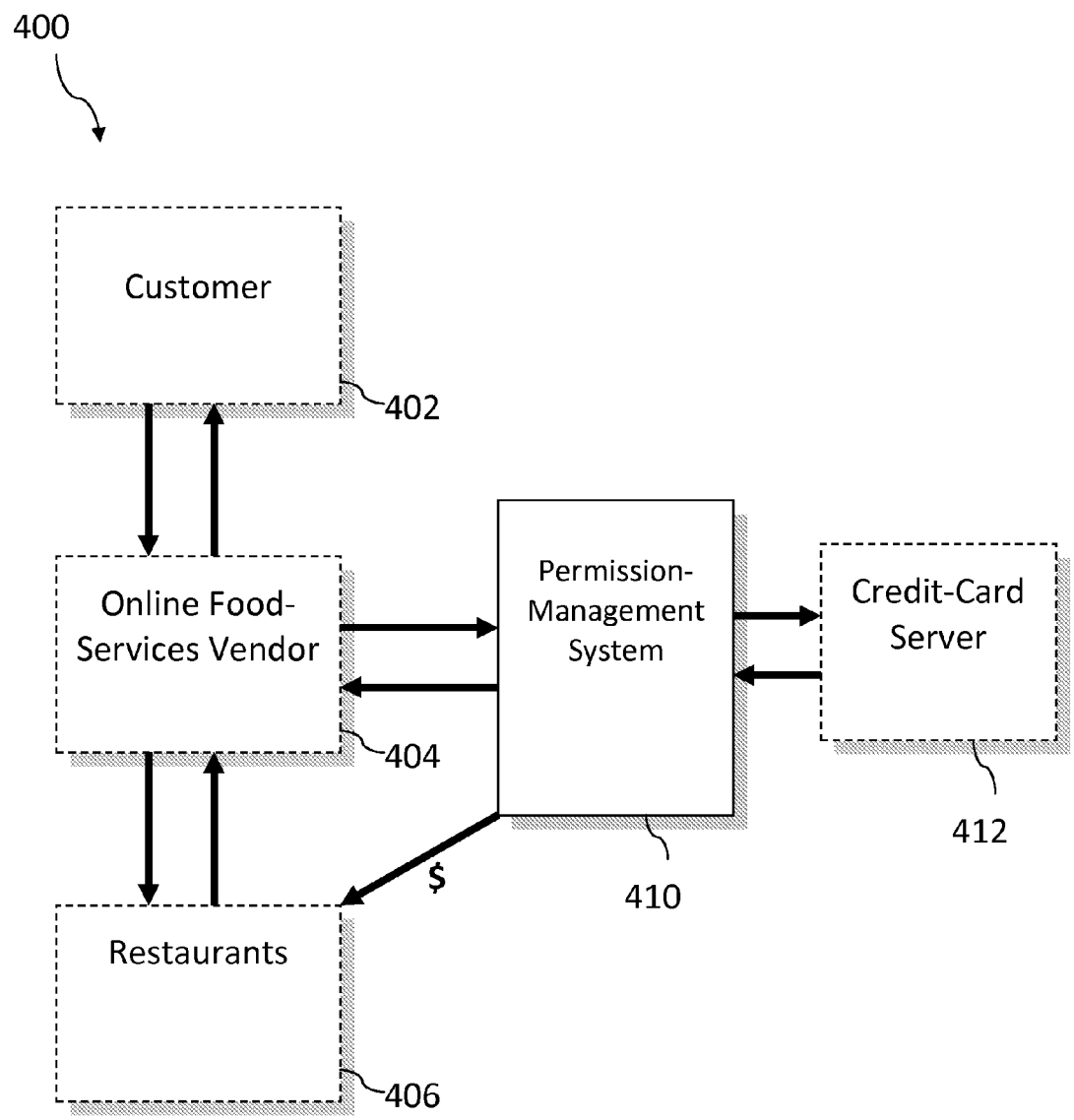
FIG. 4 illustrates an instance of an electronic-transaction system in accordance with embodiments of the present invention.

FIG. 4 illustrates an example of a particular transaction environment 400 in accordance with embodiments of the present invention in the context of online food services. A customer 402 submits a request for a food item to an online food-services vendor 404. The vendor 404 has a user-access token associated with the customer 402 and a facilitation token associated with a restaurant 406. The permission-management system 410 receives information about the request, information about the customer 402, and indications of authority (i.e., the tokens) to act on behalf of the customer 402 and restaurant 406 from the vendor 404. The system 410 grants the request based on the permissions associated with the received tokens, processes a payment associated with the request using a credit-card server 412 and transmits the payment to the restaurant 406. The restaurant 406 then provides the food item associated with the request for pick-up by the customer or for delivery by the restaurant 406, vendor 404, or some other delivery service. The payment processing/transmission and delivery steps may occur in any order.

The example environments 300, 400 are not intended to be limiting. In a sales context, any kind of merchant or vendor may replace the restaurants 406, including but not limited to sellers of clothing, electronics, books, pharmaceutical products, digital media (such as music, movies, or e-books), digital information, concert or event tickets, articles, journals, or any other type of goods. The merchant or vendor may also provide services such as construction, remodeling, health services, landscaping services, or any other type of service. The goods or services may be charged for per good or use or as part of an ongoing subscription. The merchant or vendor may further provide free goods or services, such as information, data, or guidance, which a customer or other user may access without submitting payment. More generally, the approach described herein is applicable to any type of resource to which access is requested on a controlled basis. For example, the resource 304 may manage a collection of illustrational artwork or stock photographs that are licensed on standard terms depending on the requester's intended use. In this case, the permission-management system 410 may manage access to the corpus of materials and, in some embodiments, monitor the requester's actual use of the requested items to ensure compliance with the stated use. In another example, the permission-management system 410 may manage access to a company's internal (e.g., financial) information in the context of routine inquiries (e.g., by an auditing firm or a funding source examining the practices of a prospective borrower) or non-routine events (e.g., a public offering or large litigation, where numerous parties may require access to different categories of internal records for different periods of time). In any of these cases, the permission-management system 410 can be provided with the names (or types) of requesters having varying permissions, and can thereby fulfill requests in accordance therewith on an automated basis. The permission-management system 410 may perform further follow-up activities including monitoring and/or providing promotional offers to requesters depending on the nature of the request. As used herein, the term "transaction" connotes any permissions request ranging from payment for goods or services to requests for access to tangible or intangible resources.

Figure 5:
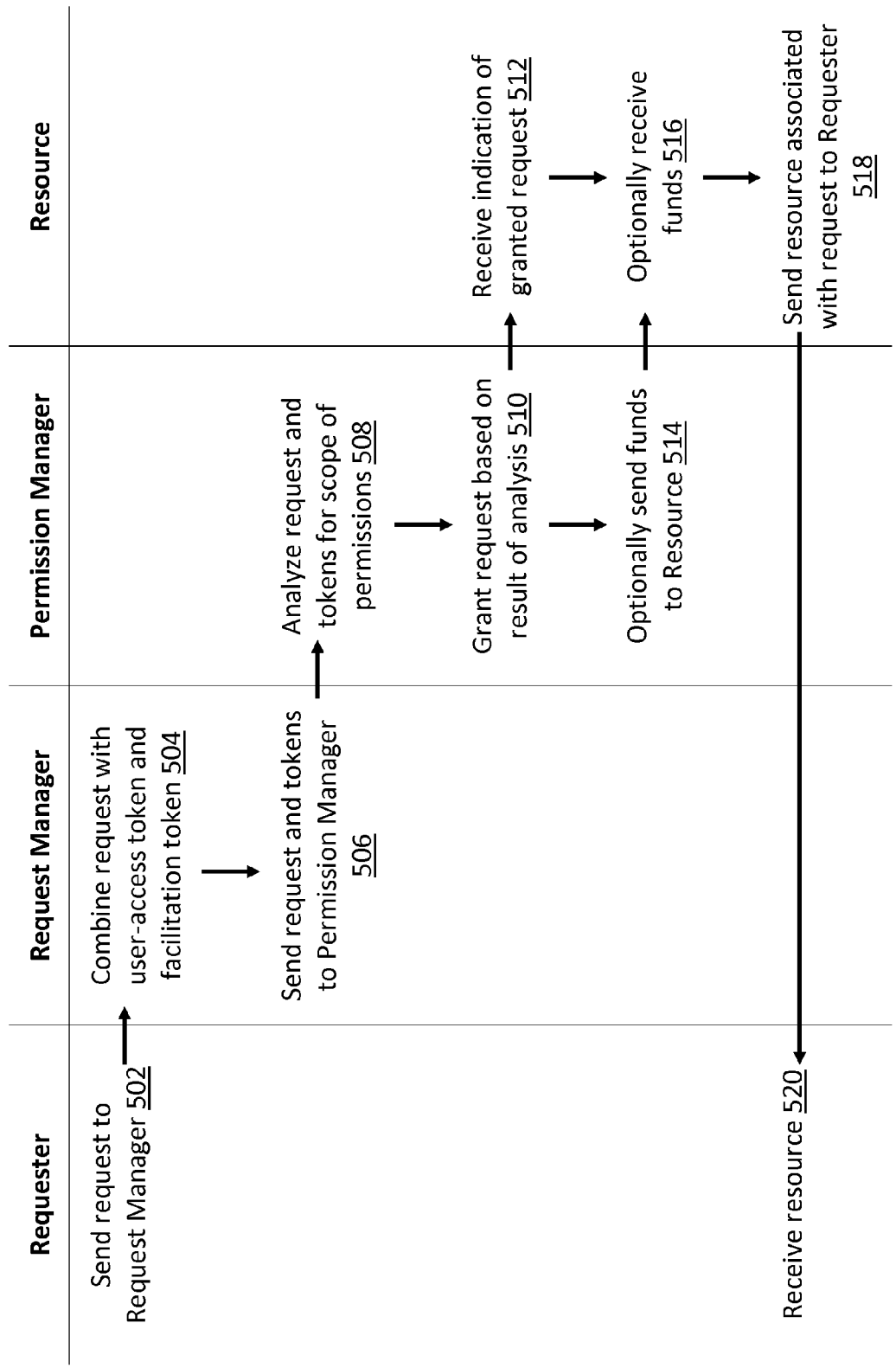
FIG. 5 illustrates a flow diagram of a transaction in accordance with embodiments of the present invention.

FIG. 5 illustrates a flow diagram of a transaction in accordance with an embodiment of the present invention. The figure illustrates the actions that the requester, request manager, permission manager, and resource may carry out, as indicated by their respective columns in the figure; the present invention, however, is not limited to only the illustrated actions, actors, and depicted steps (i.e., the steps may be combined and/or separated, as one of skill in the art will understand). In a first step 502, a requester sends a request to a request manager, which, in a second step 504, combines the request (and some or all available information associated with the requester and/or resource) with a user-access token and a facilitation token. In a third step 506, the request manager sends the request, information, and tokens to the permission manager. The permission manager, in a fourth step 508, analyzes the request and the scope of the permissions defined by the tokens (as explained in greater detail below) to determine whether or not the request should be granted. If it is to be granted, in a fifth step 510, the permission manager grants the request and sends an indication of the granting to the resource (and/or the request manager) in a sixth step 512. If a payment is associated with the granting of the request, the permission manager may secure the payment (from, e.g., a third-party credit-card system and/or other source of funds associated with the requester) and send the payment in a seventh step 514. The resource receives the payment in an eighth step 516. The resource then sends the resource associated with the request in a ninth step 518, and it is received by the requester in a tenth step 520.

Figure 6:
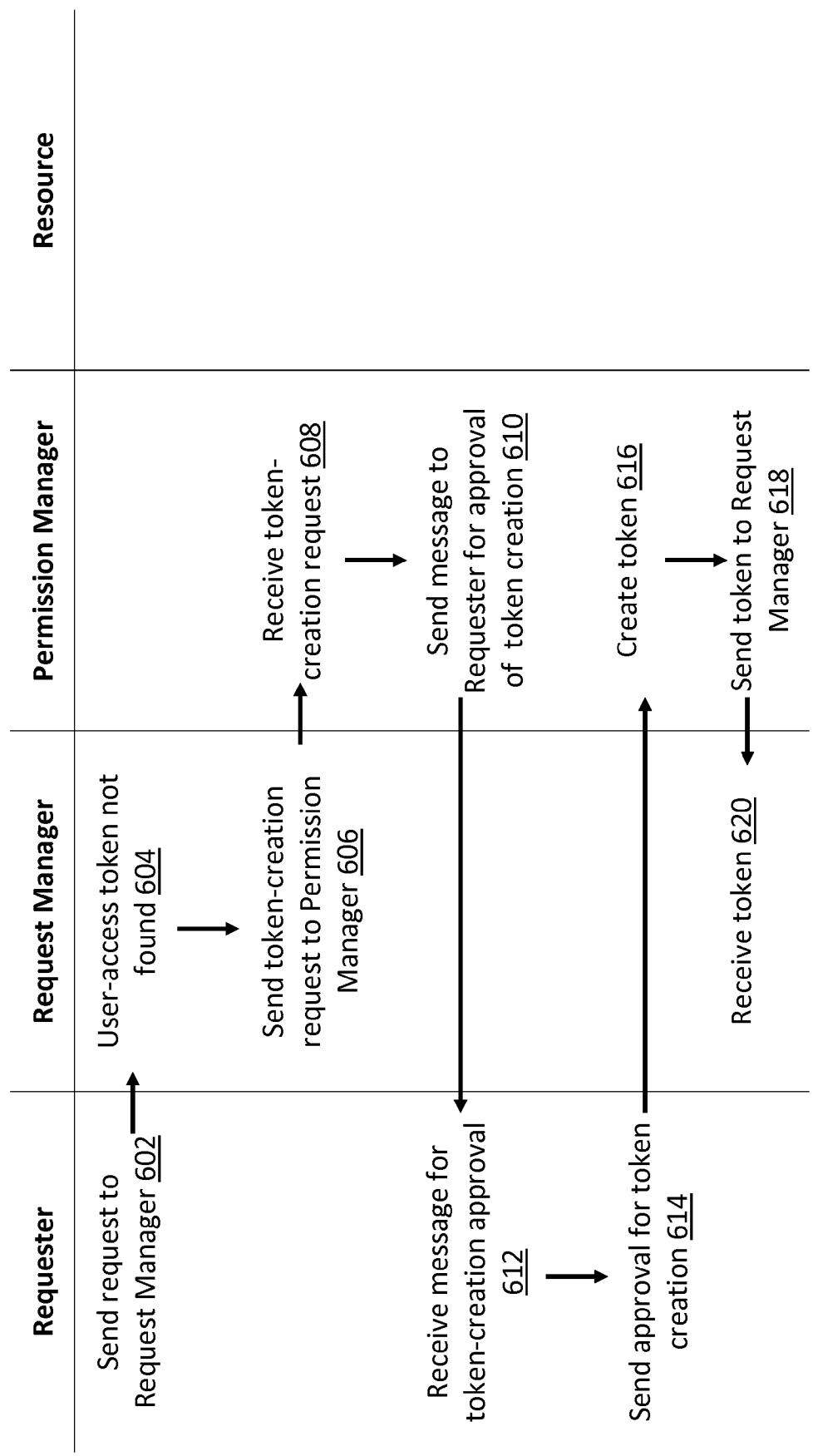
FIG. 6 illustrates a flow diagram of creation of a user-access token in accordance with embodiments of the present invention.

FIG. 5 illustrates a transaction in which a request manager already possesses a user-access token associated with the requester (i.e., the requester has already configured a user-access token). FIG. 6 illustrates a flow diagram of a process to create a user-access token for a requester. The steps of FIG. 6 may execute at step 504 of FIG. 5 if no user-access token is found for the requester, at which the rest of the steps of FIG. 5 may thereafter be performed.

In a first step 602, the requester sends a request to the request manager (as described in the first step 502 of FIG. 5). The request manager, however, determines that no user-access token is associated with the requester in a second step 604 (and/or an associated user-access token is expired, corrupted, or otherwise unusable). In a third step 606, the request manager sends a token-creation request to the permission manager, which receives it in a fourth step 608. The token-creation request, as described in greater detail below, may include information about the requester such as name, address, email address, telephone number, financial-account information, or other information. In a fifth step 610 the permission manager sends a message to the requester (via, for example email, SMS messaging, or directly to a software application running on a requester device) for approval of the creation of the token. The requester receives the message in a sixth step 612 and sends approval in a seventh step 614. The approval may, as described in greater detail below, include a definition of the type or scope of permission to be granted by the token, such as a maximum monetary charge, a maximum number of transactions, an expiration date or time, or other such limiting factors. The permission manager creates the user-access token in an eighth step 616 and sends the token to the request manager in a ninth step 618. The request manager receives the token in a tenth step 620 and may thereafter proceed with the transaction described in FIG. 5 (at, for example, step 504).

Figure 7:
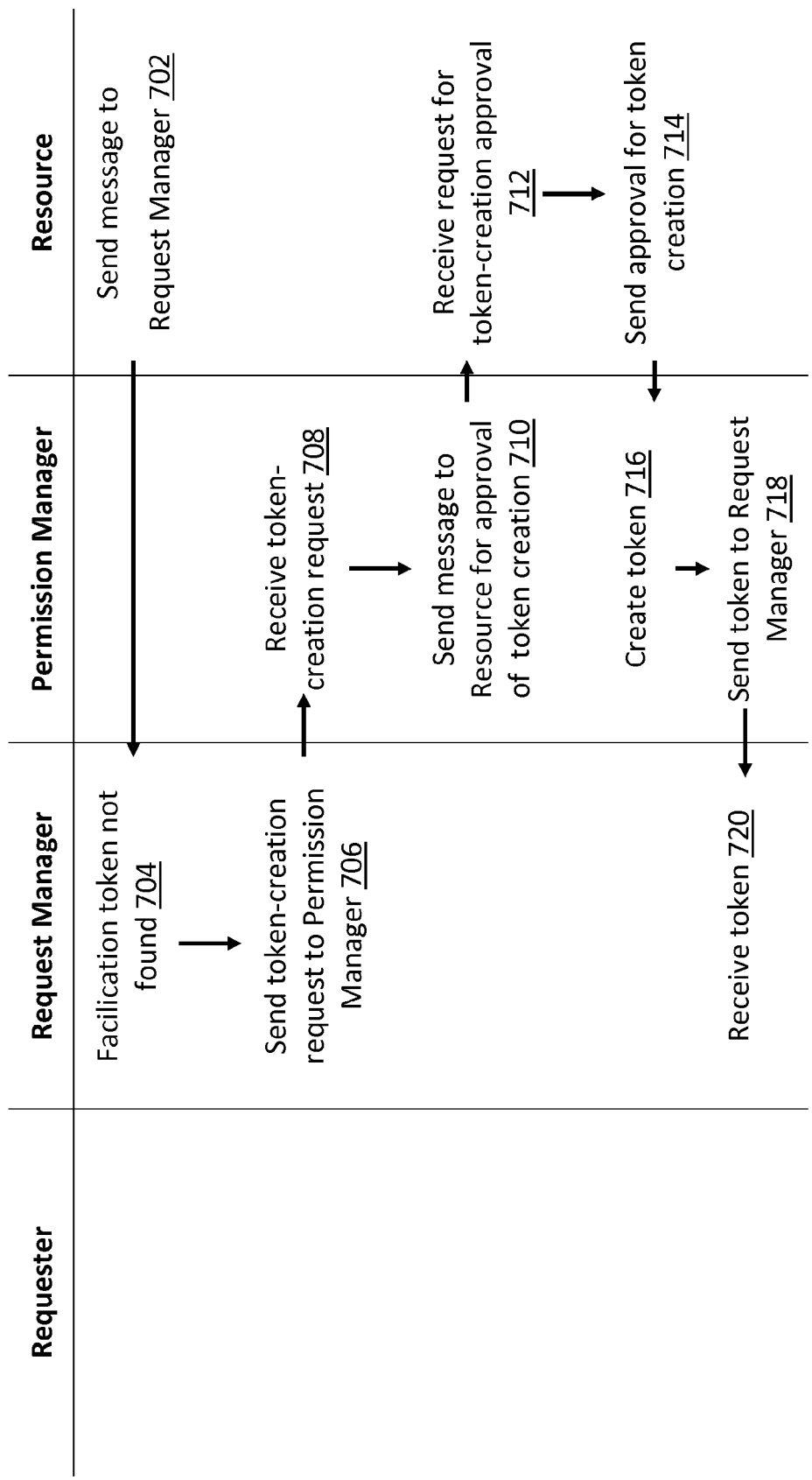
FIG. 7 illustrates a flow diagram of creation of a facilitation token in accordance with embodiments of the present invention.

FIG. 7 illustrates a flow diagram of a process to create a facilitation token for a resource. In one embodiment, the resource sends a message to the request manager in a first step 702, and the request manager determines that no facilitation token associated with the resource exists in a second step 704. The request manager therefore sends a token-creation request to the permission manager in a third step 706, which is received in a fourth step 708. The permission manager sends a message to the resource for approval of the creation of the token in a fifth step 710. The resource receives the token in a sixth step 712 and sends approval in a seventh step 714; the resource may send, with the approval, information regarding the limits and scope of the permissions associated with the token. The permission manager creates the token in an eighth step 716 and sends the token to the request manager in a ninth step 718. The request manager receives the token in a tenth step 720.

Figure 8:
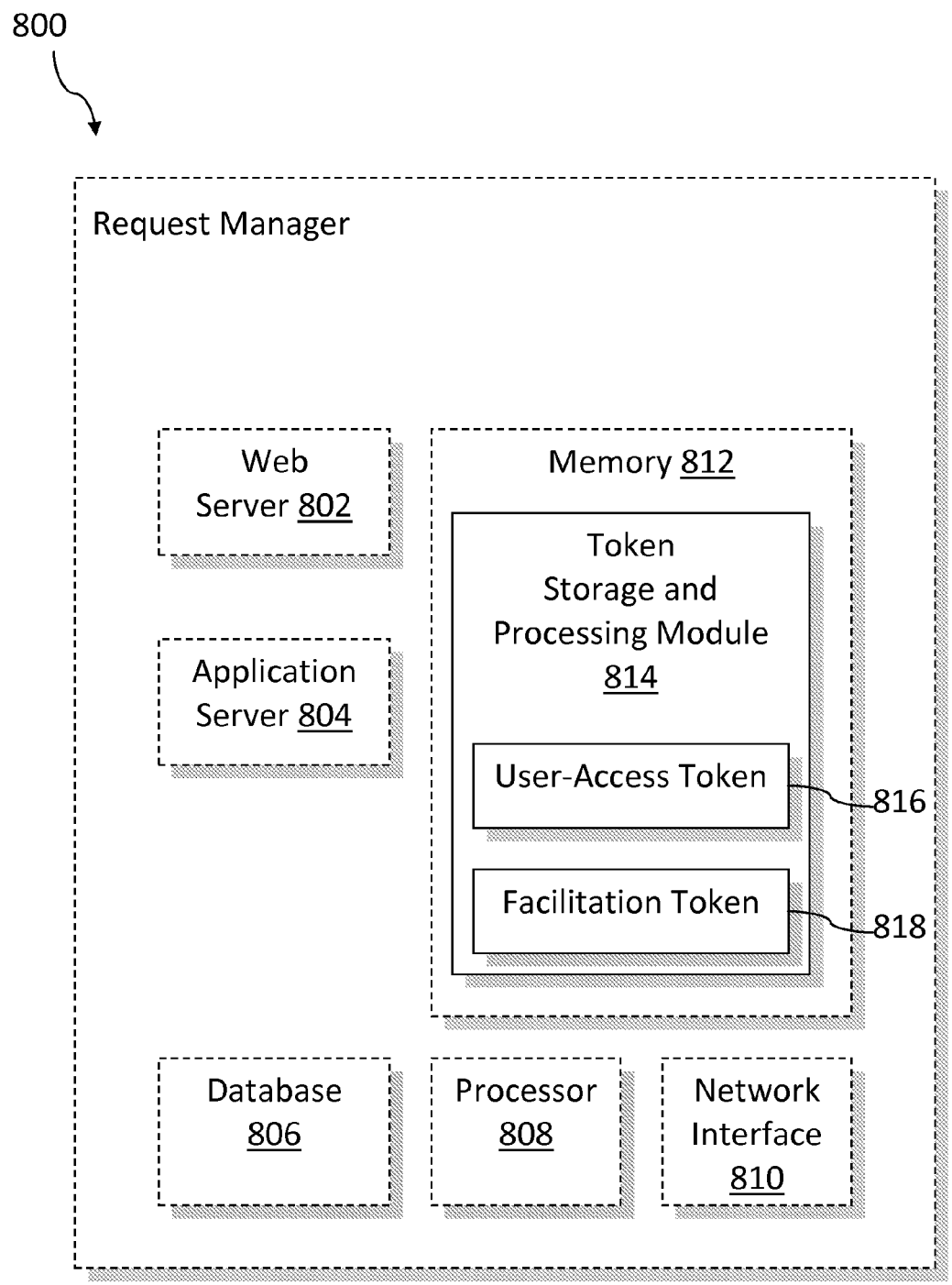
FIG. 8 illustrates a request-granter system in accordance with embodiments of the present invention.

FIG. 8 illustrates one embodiment of a request manager 800. In this illustrative embodiment, the request manager 800 includes a web server 802, an application server 804, a database 806, a processor 808, a network interface 810, and a memory 812. The request manager 800 may be a server, group of servers, or a software-as-a-service system. As discussed above, however, the request manager 800 is not limited to any particular configuration, architecture, or system; the request manager 800 may instead include, for example, a point-of-sale system and/or a combination point-of-sale system and server.

As discussed above, the request manager 800 stores thereon indications of authority from a requester and/or a resource that grant permissions to act on behalf of one or both parties. In one embodiment, the indication of authority is a token. The token may be any form of digital data, such as a digital file, group of files, or data stream. The token may include information identifying the sender (such as name, address, telephone number, or location), financial-account information (such as bank-account information or credit-card information), a digital signature, a username and/or password, challenge questions and responses, or minimum or maximum transfer amounts. The token may be encrypted using an RSA or similar algorithm. In some embodiments, the tokens conform to industry standards, such as tokens used for financial transactions. The present invention is not limited to any particular type or format of token, however, nor to any particular information contained therein.

In one embodiment, the memory 812 includes a token storage and processing module 814. A requester may be associated with a user-access token 816 that may be received via the network interface 810 and stored in the token module 814; a resource may be similarly associated with a facilitation token 818. As described above with reference to FIGS. 5-7, the request manager 800 may send the tokens 816, 818 to a permission manager, along with information regarding a request, when the request is received from a requester. The tokens 816, 818 may be generated by the permission manager and, upon generation, received therefrom and stored in the token module 814.

The user-access token 816 and/or facilitation token 818 may be received each time the user or customer initiates and requests a transaction, in accordance with the user-access token creation process described above with respect to FIG. 6; in other embodiments, the user-access token 816 and/or facilitation token 818 is received one time for multiple transactions. For example, the user may create the user-access token 816 when the user sets up an account with the request manager 800 and/or permission-management system, as described in greater detail below, and that token may be used for a plurality of subsequent transactions. In one embodiment, if the user-access token is to be associated with only one transaction, the token includes only information indicating approval for that transaction and not, for example, permissions or scopes for other transactions.

In various embodiments, computer code, executable program files, scripts, or other software modules may be provided to the request manager 800 to enable installation and execution of the token module 814. In other embodiments, specifications, application-programming interfaces, software-development kits, or similar instructions or directions may be provided to the request manager 800 for construction and implementation of the token module 814. The depiction of the token module 814 as a single program block in FIG. 8 is not intended to be limiting; the token module 814 may be implemented in separate programs or locations (such as, e.g., part of the web server 802).

Figure 9:
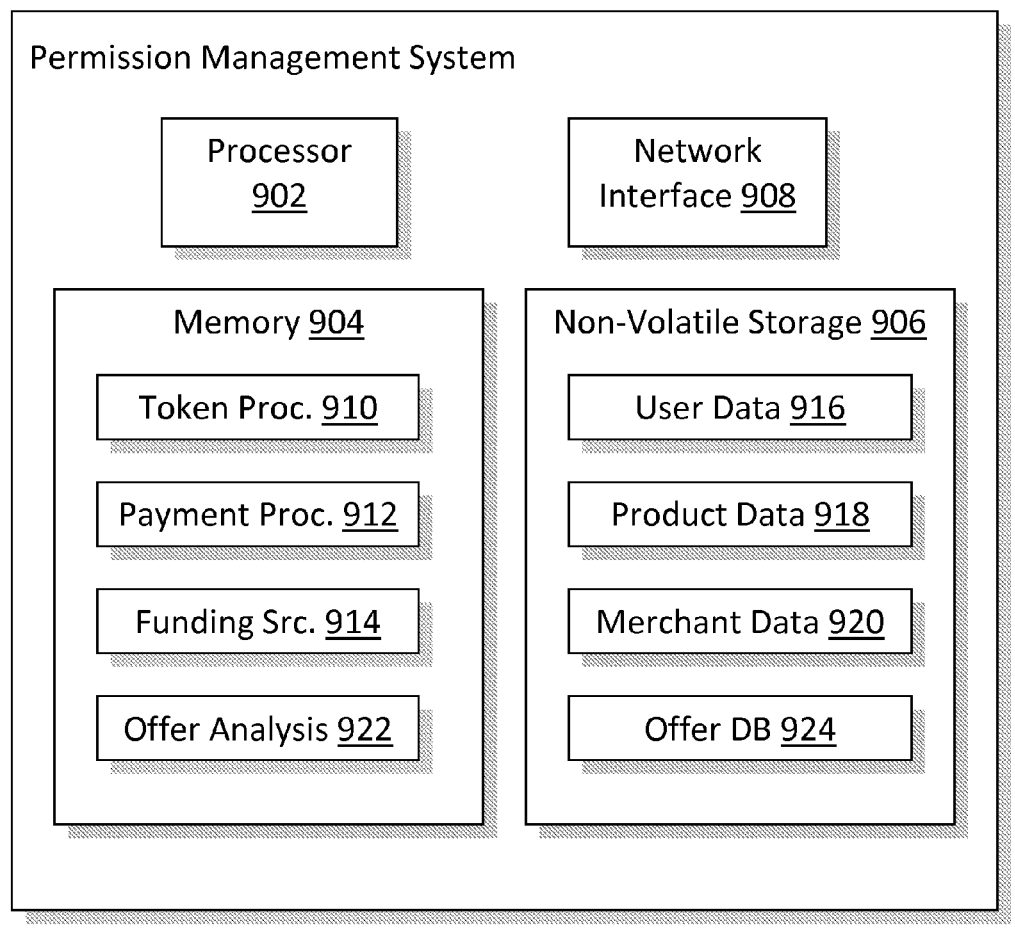
FIG. 9 illustrates a permission-management system in accordance with embodiments of the present invention.

FIG. 9 illustrates an embodiment 900 of a permission-management system configured for conditionally granting requests, payment processing, and/or data collection, such as the system 410 depicted in FIG. 4. As described above, the system 900 may be any computing device or group thereof, such as a server, group of servers, software-as-a-service providers, or any other such device. The system 900 includes a processor 902, a memory 904, non-volatile storage 906 (e.g., a disk or database), and a network interface 908. The non-volatile storage may be local to the system 900 or may be remote or distributed and accessed via a network connection. Indeed, the functionality of all system resources described herein may be distributed among multiple devices or virtualized according to routine design choice.

In one embodiment, a token-processing module 910 in memory 904 includes computer instructions for receiving user-access and facilitation tokens from a request manager (such as the request manager 800 shown in FIG. 8). The token-processing module 910 may analyze the tokens 816, 818 for authenticity by, for example, successfully decrypting the tokens, examining the format of the data within the tokens, verifying a digital signature associated with the tokens, communicating with the requester and/or request manager to confirm sending of the tokens, or by any other means. The token-processing module 910 may also analyze the user-access token to determine whether the request for goods or services contained in the user-access token is permitted by the information in the facilitation token. Typically, the token-processing module 910 receives paired user access and facilitation tokens associated with a particular request.

In one embodiment, the user-access token 816 includes information specifying the identity of the user or customer sending the token 816, such as the user's name, address, telephone number, email address, or an identifier assigned by the permission-manager. The user-access token 816 may also include time or location data, such as the current date or time or the location of the user. The user-access token 816 may further include financial information related to the user, such as the number of a bank account, credit card, debit card, payment aggregator, or other account information, or any other information relevant to resource access (e.g., professional affiliation or other information characterizing the requester and relevant to a permissions category). The user-access token 816 may also provide a reference to any such information stored by the permission-manager.

In addition to the identification, financial, and other information associated with the user, the user-access token 816 may contain information indicating the scope of the permissions the user wishes to allow. The details of the permission scope may be set by input from the user and/or by requests, prompts, or questions sent to the user by a request manager and/or resource. For example, a user may specify in his or her user-access token a maximum amount to charge per time period, a maximum number of items to be purchased, or types of items that may not be purchased. The user-access token may also specify other permissions, such as permission to charge the user for future payments or permission to extend credit to the user (either for the current or future transactions). The request manager and/or resource may further prompt the user for information associated with the user and/or the user's transactions, such as permission to read and/or modify the user's transaction history, account information, or identification information. The request manager and/or resource may further prompt the user for permission to claim campaign or loyalty rewards program benefits on behalf of the user. The user-access token may also provide a reference to permissions established with the permission-manager, which may be modified or revoked by the user at any time by communicating with the permission-manager without the need for the user to communicate to the request manager.

The resource is associated with a facilitation token 818 that indicates permission to grant requests for goods or services on behalf of the resource. Like the user-access token 816, the facilitation token 818 may include any type of data in any format, and is not limited to any particular contents. The facilitation token 818 may include information identifying the resource, financial information related to the resource (such as a deposit bank account), and security information or protocols ensuring that the resource is the sender of the facilitation token 818. The facilitation token 818 may be provided on a per-transaction basis but, more commonly, is persistent over a period of time so that requests consistent with the token—i.e., with information stored on the token itself or by the permission manager 900 on behalf of the resource—are recognized. The facilitation token 818 may further specify any number of additional permissions, such as permission to create credit on behalf of the resource, view locations at which the resource has places of business, or view the transaction history of the resource.

The facilitation token 818 may also include, or provide a reference to, information regarding the types of requests that the permission manager 900 is permitted to grant. In one embodiment, the facilitation token 818 grants authority for all requests the resource is capable of fulfilling. For example, if the resource is a restaurant, the facilitation token 818 may authorize the permission manager 900 permission to grant requests from requests for any item on its menu. In other embodiments, the facilitation token 818 limits the authority of the permission manager 900 to grant requests to certain requestors (based on the identity of the requester, the location of the requester, an amount of funds available to the requester, or any other attribute of the requester). For example, if the resource is a restaurant, the facilitation token 818 may limit the permission manager 900 to only a subset of the available menu items for certain customers; if a given customer is located further than a certain distance from the restaurant, for example, that customer may be limited to only a subset of the menu, and the permission manager 900 may not grant requests for menu items outside of the subset (as specified by the facilitation token 818). Customers located within the given distance, however, may order from the full menu. Similarly, attorneys representing an underwriter may be accorded access to an electronic "data room" managed by a resource-management system, but other requesters, lack the proper token 818 or not registered with the request manager, will be turned away.

The ability of the permission manager 900 to grant requests may be further limited by other factors, such as the time of day, the day of the week, an available inventory of the resource, or any other factors. Again using the example of the resource being a restaurant, the facilitation token 818 may specify a late-night menu that is a subset of the full menu; past a certain time in the evening, the permission manager 900 may not grant requests for food items not available on the late-night menu.

In other embodiments, the facilitation token 818 may specify that the permission manager 900 must communicate with the resource before granting a request for some or all requested items. For example, the facilitation token 818 may require that the permission manager 900 verify that the resource possesses a requested good or service in its available inventory or capability before granting a request.

The user-access token 816 may be generated in any of a variety of ways. As described above, the user-access token may be generated by the permission manager and thereafter sent to the request manager. In other embodiments, the user accesses the request manager 800 via a web page created by (for example) the web server 802. The token module 814 may collect relevant data (as described above) from user-submitted information in the web page and create the user-access token 816 therefrom. In another embodiment, the user-access token 816 may be created by a user device; the user may download a smartphone application, for example, for use in communication with the request manager 800, and the smartphone application may create the user-access token 816 based on data submitted by the user to the smartphone application and/or data or information collected from the smartphone (such as, e.g., location information). In other embodiments, the user-access token 816 is generated partially by the user device and partially by the request manager 800.

In various embodiments, the user-access token 816 and/or facilitation token 818 may identify a payment instrument or payment account, or a requester category or permissions category, but may not identify the requester or resource. The requester or resource may transmit information about the payment instrument or account to the token module 910, which may encrypt the received information with a one-way key and either create an encrypted token based thereon or pass the encrypted data to a third-party payment gateway, which may have a key to decrypt the data, may generate a token that identifies the registered payment instrument, account, or other information. The generated token is transmitted back to the token module 910 and stored therein for transacting the current or future payments. Because the data including a requester's or resource's identity and payment instrument and/or account are separately stored in the token module 910 and the third-party payment gateway, respectively, unauthorized access to any one of the records therein is insufficient to initiate a payment transaction under the requester's or resource's name, thereby ensuring the security of the mobile payment. Further approaches for generating a secure payment token are described in, for example, U.S. patent application Ser. No. 13/718,466, filed on Dec. 18, 2012, and Ser. No. 13/960,260, filed on Aug. 6, 2013, the entire disclosures of which are hereby incorporated by reference in their entirety.

A payment-processing module 912 processes a payment associated with the request or accompanying the user-access token (upon verification of the user-access and facilitation tokens 816, 818 and approval of the request based thereon). The payment-processing module 912 may draw funds needed for payment from a funding source 914 within the system 900 or from an external funding source, such as a bank, credit card, debit card, or payment aggregator. If the funds are successfully procured, the payment-processing module 912 sends the funds electronically, via the network interface 908, to the resource. One of skill in the art will understand, however, that the procurement of funds is not a prerequisite to sending funds to the resource, and procurement may occur later, or not at all.

The non-volatile storage 906 may collect information about the requester, the resource, and/or granted requests. Information about the requester, such as name, address, email address, phone number, financial account information, location, and buying/shopping history may be stored in a user database 916. In one embodiment, the requester creates a user account on the system 900; the user-account information is stored in the user database 916, and subsequent purchases by the user are associated with the user account. In another embodiment, the requester has no user account; information about the requester may, in this case, be stored using available information (in, for example, the user-access token) and subsequent purchases by that requester combined with earlier-saved information by matching, for example, the name, address, or financial-account information associated with the user. If the requester later creates a user account, previously collected data for that requester may be retroactively stored in the user account.

Information about the products and/or services purchased may be stored in a product and services database 918. This information may include, for example, numbers of purchases of a given product or service; numbers of purchases of types, categories, or classifications of products or services; locations of purchases; times and dates of purchases; purchase trends; correlations between different products or services purchased; or any other type of similar information. In a permissions context, the database 918 may contain restrictions associated with provisioned or licensed content, and a running process within the memory 904 may periodically verify compliance by recipients of the licensed material—e.g., by searching the web for watermarks associated with licensed digital images and ensuring they have not proliferated or been used in an unauthorized manner.

Information about resources may be stored in a merchant database 920. This information may include, for example, products and services purchased from a merchant or set of merchants; rates of purchases; locations of purchases; times and dates of purchases; purchase trends; correlations between different products or services purchased; or any other type of similar information.

In some embodiments, an offer-analysis module 922 determines whether the transaction in a request qualifies for one or more promotional offers based on offer rules associated with offers stored in an offer database 924. In some embodiments, the offer rules are provided by third parties prior to or during the transaction. In some embodiments, the offer-analysis module 922 analyzes the transaction in a request, the offer rules, and/or the requester's profile and records (containing historical transactional and/or non-transactional data) stored in the user database 916 to determine which, if any, promotional offer(s) are applicable to the requested transaction. If there are multiple offers whose offer rules are satisfied by the current transaction, in one embodiment, the offer-analysis module 922 identifies the best deal (e.g., having the largest discount) and presents it to the requester by transmitting it, via the network interface 908, to the requester's device (via the request manager 800 or directly to the requester using the requester's stored email address or device ID, for example). In another embodiment, the offer-analysis module 922 transmits all applicable offers to the requester.

The requester may approve and/or select the desired offer(s) and communicates his or her decision to system 900 (directly or via the request manager 800). Upon receiving the communication from the requester, and assuming it reflects acceptance of the offer, the offer-analysis module 922 modifies the current transaction (e.g., updating the price to reflect the accepted offer) and transmits the modified transaction request to the payment processor 912 for approval, or, in some embodiments, authorizes the modified transaction directly. In other embodiments, once the applicable offer(s) are identified, the offer-analysis module 922 automatically modifies the transaction to redeem the offer(s) without the need for the requester's approval. In various embodiments, after completion of the current transaction, the offer-analysis module 922 analyzes the completed transaction, the offer(s) approved/selected by the requester, and/or the transactional rules to identify offers for potential future transactions based on the offer rules. The offer-analysis module 922 transmits the identified offer(s) to the requester as an incentive for future purchases. The offer(s) may be transmitted to the requester's device in the form of, for example, a coupon or a link that directs the requester to retrieve the offer(s). The coupon or link may be stored in the offer database 924, a request-fulfiller database, a request manager database, or in any other location. In addition, the transmitted or retrieved coupon may be formatted as a code (such as, a barcode, an RFID code, or a QR code, and/or a signal, such as an NFC signal, an audio signal, or an infrared signal).

In one embodiment, the offer-analysis module 922 classifies the requester's records, including transactional and/or non-transactional data and the offer rules into multiple classes prior to a transaction to facilitate offer analysis. Transactional classes may be drawn from earlier requester purchases, and may correspond to categories of goods or services purchases by the requester within a recent time period and may also be sorted by attributes such as price, merchant, merchant location, etc. Non-transactional classes may include demographic data known about the requester, e.g., age, gender, address, etc. During the current transaction, the offer-analysis module 922 assigns data from the transaction request to one or more classes. Applicability of the offer rules to the current transaction is then evaluated by the offer-analysis module 922 on a class-by-class basis (with the various classes weighted, if desired) to simplify the analysis.

In some embodiments, third parties may register offers with the system 900. These offers are stored in the offer database 924 and may be withdrawn and/or modified as desired by the third-party offer providers. The offers in the offer database 924 (in their current form) are evaluated as described above, and once again, one or more offers (e.g., the best deal) satisfying the offer rules are provided to the consumer. In alternative embodiments, third parties may provide offers in real time based on the current transaction as well as, in some embodiments, historical transactional and/or non-transactional data for the requester. These offers may be assessed and filtered in any of various ways. For example, the offer-analysis module 922 may allow offer providers to bid, in real time, for the privilege of providing an offer to the consumer. In such embodiments, data reflecting the current transaction (e.g., goods purchased and price), and optionally historical transactional and/or non-transactional data for the consumer, are transmitted to offer providers registered with the system 900. Interested offer providers submit bids to the system 900 reflecting how much they are willing to pay to have their offer presented to the requester; this amount may be staged to reflect, for example, a first fee for transmission of the offer and a second fee if the requester actually redeems the offer. The first fee may be tiered so that the offer provider has the option of bidding a higher amount for exclusivity, i.e., to preclude other offers from being simultaneously provided to the requester. The offer-analysis module 922 may assess the bids as well as item-level and/or source-level conflicts (in some embodiments to prevent two offers for competing items from being simultaneously present to the requester, for example, or in other embodiments to present such competing offers). All of this may occur prior to submission of the transaction for payment. Depending on the nature of the offer(s), they may be redeemed immediately by the requester, in which case the transaction is modified before submission for payment, and/or may simply be supplied to the requester's mobile device for future use. Further approaches for generating offers are described in, for example, U.S. patent application Ser. No. 14/174,116, filed on Feb. 6, 2014, the entire disclosure of which is hereby incorporated by reference in its entirety.

Figure 10:
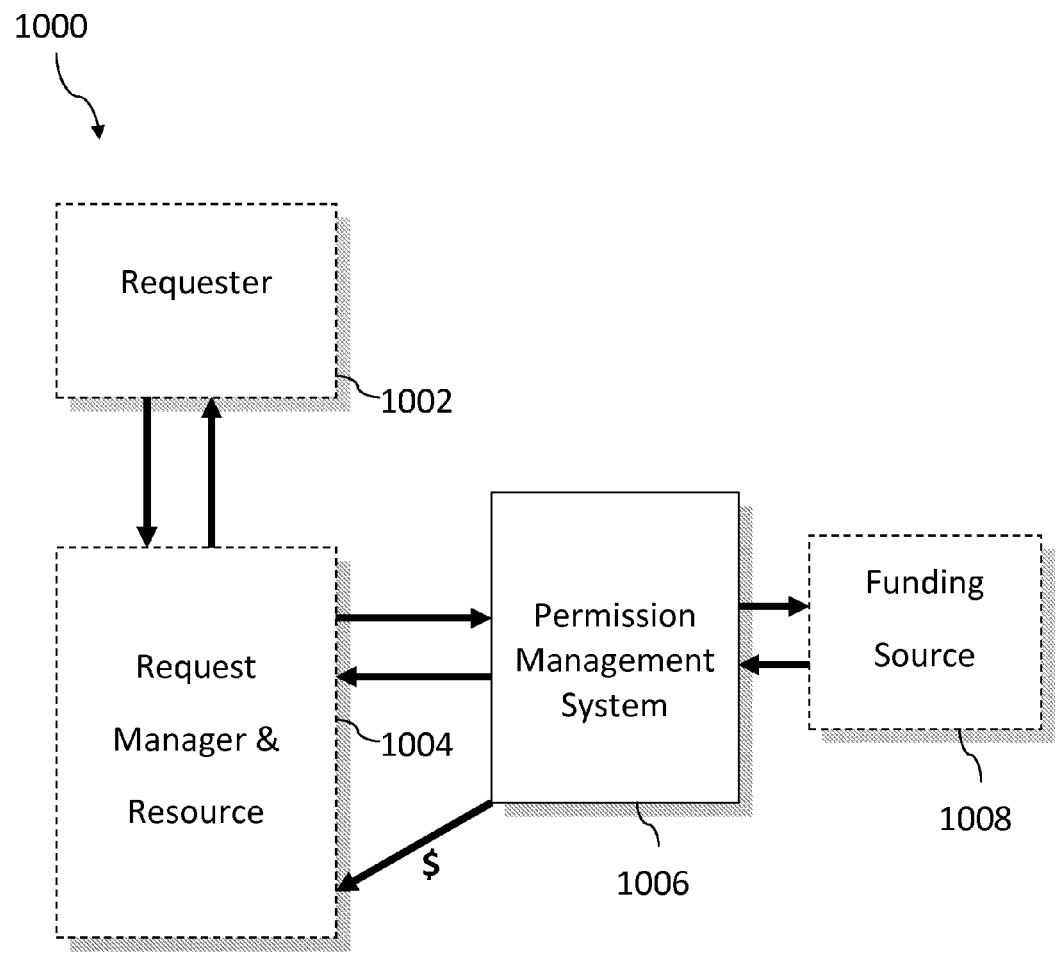
FIG. 10 illustrates an electronic-transaction system in accordance with embodiments of the present invention.

In one embodiment, the resource is also the request manager. FIG. 10 illustrates an environment 1000 that includes an example of this embodiment. A requester 1002 communicates with a request manager/fulfiller 1004 and sends a request for goods or services thereto. The request manager/fulfiller 1004 includes a token module, such as the token storage and processing module 814 described above with reference to FIG. 8, for receiving and/or generating a user-access token associated with the request. The request manager/fulfiller 1004 may grant the request and send the user-access token and, in some embodiments, a facilitation token to a payment-processing and data-collection system 1006. In other embodiments, the request manager/fulfiller 1004 sends only the user-access token to the system 1006; the system 1006 assumes that the request manager/fulfiller 1004 has granted permission for the request upon receipt of the request. The request manager/fulfiller 1004 may include some or all of the systems, components, and functions discussed above with reference to the request manager of FIG. 8, and the system 1006 may include some or all of the systems, components, and functions discussed above with reference to the system 900 of FIG. 9.

Figure 11:
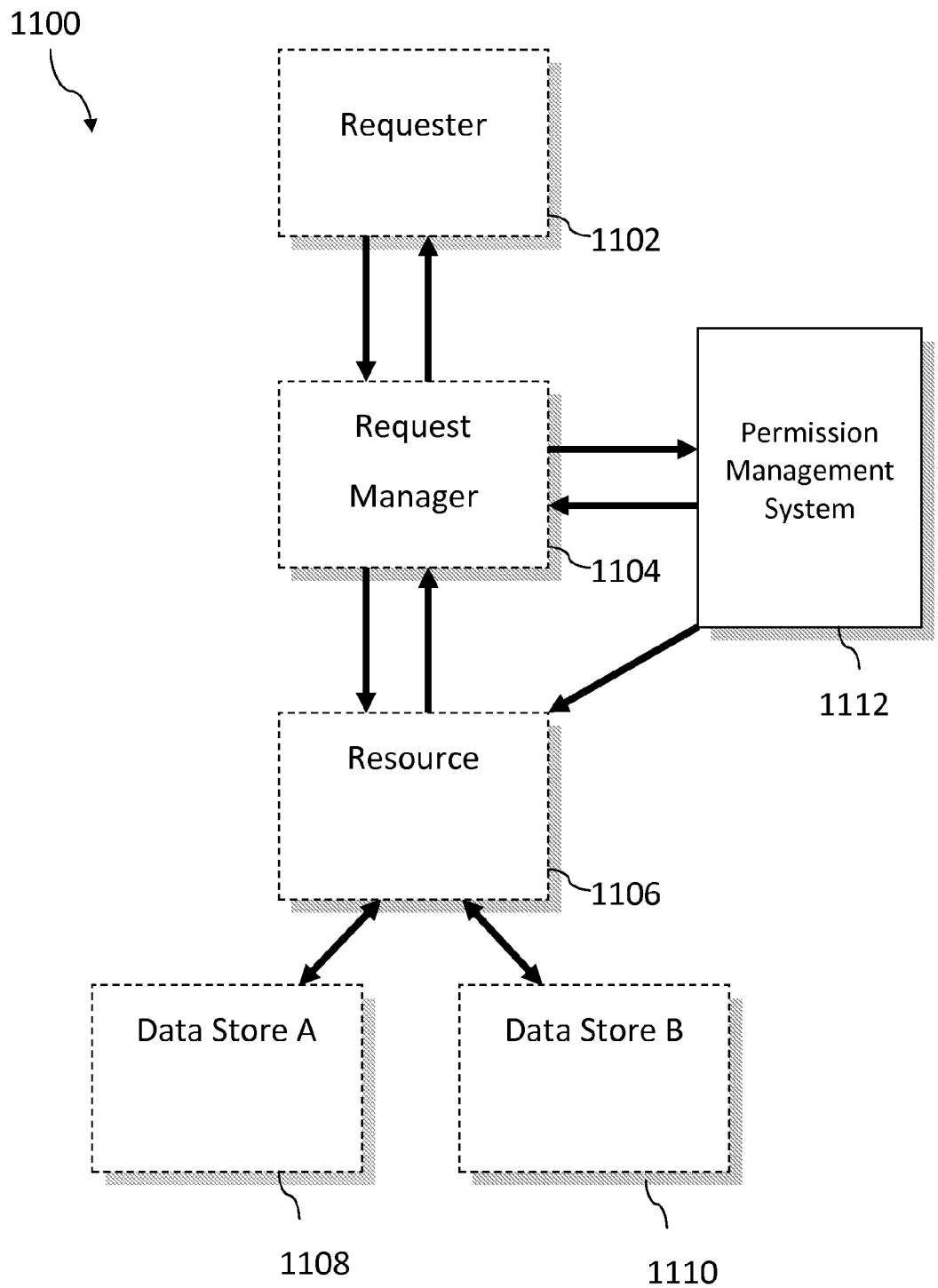
FIG. 11 illustrates an electronic-data-delivery system in accordance with embodiments of the present invention.

FIG. 11 illustrates an environment 1100 suitable for handling requests for information. A requester 1102 submits a request to a request manager 1104, which, as discussed above, creates and/or receives a user-access token associated with the request. A resource 1106 transmits (or, more typically, has previously transmitted) a facilitation token to the request manager 1104. Similar to how the facilitation token 818 discussed above may restrict access to certain goods based on the identity requester, here the facilitation token may allow access to certain kinds of information to only certain requesters. For example, if the resource 1106 includes or has access to two data stores, data store A (indicated at 1108) and data store B (indicated at 1110), the facilitation token may specify that only a first subset of requesters may access information in data store A, only a second subset of requesters may access information in data store B, and only a third subset of requesters may access information in either data store. The resource-management system 812 may receive both the user-access and facilitation tokens and a token-processing module therein may grant or permit the requested accessed based on the received tokens. If access is permitted, the requested information may be transmitted electronically or otherwise to the requester 1102 by the system 1112, request manager 1104, and/or resource 1106. In other embodiments, the requester 1102 may instead or in addition request that information be sent to the resource 1106 for storage therein (in, e.g., one of the data stores 1108, 1110). This write access to the data stores 1108, 1110 may be performed in accordance with the read access described above. Further, as described above with reference to FIG. 10, the request manager 1104 and the resource 1106 may be the same entity.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for facilitating electronic transactions, the method comprising:
   electronically receiving, from a request-manager device, a facilitation token comprising permissions to act with respect to a resource;
   electronically receiving, from the request-manager device, a request for goods or services from the resource and a user-access token comprising permissions to act on behalf of a user;
   verifying, by a processor, the facilitation token and the user-access token and that granting the request is permitted by the resource and the user based at least in part on information in the facilitation token and user-access token; and
   causing data transfer to a resource device associated with the resource to cause fulfillment of the request by the resource.

2. The method of claim 1, wherein an identity of the user making the request or a location of the user making the request is further received from the request-manager device.

3. The method of claim 2, further comprising storing, in a user-profile database, the identity of the user, a date or time that the request was made, or a type of the goods or services requested by the user.

4. The method of claim 1, wherein the request comprises transfer of funds by a payment manager, the payment manager performing the verifying step and thereafter causing electronic transmission of the funds to the resource.

5. The method of claim 1, wherein the request comprises transfer of restricted information by a resource manager, the resource manager performing the verifying step and thereafter causing electronic transmission of the restricted information to the user.

6. The method of claim 1, further comprising creating the facilitation token based on information received from the resource and transmitting the facilitation token to the request-manager device.

7. The method of claim 1, further comprising creating the user-access token based on information received from the user and transmitting the user-access token to the request-manager device.

8. The method of claim 1, further comprising electronically transmitting a promotional offer to the user, wherein the promotional offer is based at least partly on information in the request.

9. The method of claim 8, wherein the promotional offer is further based on at least one of a purchase history of the user or offer information received from the resource.

10. The method of claim 1, wherein the request manager is an online food-services merchant and the resource is a restaurant.

11. The method of claim 1, wherein the request manager and resource are the same entity.

12. The method of claim 1, wherein the request manager and resource are different entities.

13. A system for facilitating electronic transactions, the system comprising:
   a database for storing customer, product, or services information associated with a resource; and
   a computer processor configured for executing computer instructions for computationally executing the steps of:
      i. electronically receiving, from a request-manager device, a facilitation token comprising permissions to act on behalf of the resource;
      ii. electronically receiving, from the request-manager device, a request for goods or services from the resource and user-access token comprising permissions to act on behalf of a user;
      iii. verifying the facilitation token and the user-access token and that granting the request is permitted by the resource and the user based at least in part on information in the facilitation token and user-access token; and
      iv. causing data transfer to a resource device associated with the resource to cause fulfillment of the request by the resource.

14. The system of claim 13, wherein the request-manager device comprises a server.

15. The system of claim 13, wherein the computer processor is further configured for electronically transmitting a promotional offer to the user, wherein the promotional offer is based at least partly on information in the request and information in the database.

16. The system of claim 15, further comprising automatically redeeming a promotional offer previously communicated to the user in connection with a previous request by the user.

17. The system of claim 13, further comprising receiving, from the request-manager device, an identity of the user or a location of the user.

18. The system of claim 13, wherein the promotional offer is further based on at least one of a purchase history of the user stored in the database or offer information received from the resource.

19. The system of claim 13, wherein the computer processor causes fulfillment of the request following receipt by the system of funds associated with the request.

20. The system of claim 13, wherein the computer processor is further configured for storing, in a user-profile database, the identity of the user, a date or time that the request was made, or a type of the goods or services requested by the user.

21. The system of claim 13, wherein the computer processor is further configured for transmitting information to the user in fulfillment of the request.

* * * * *